United States Patent
Budianu et al.

(10) Patent No.: US 12,221,085 B2
(45) Date of Patent: Feb. 11, 2025

(54) METHOD FOR OPERATING A BRAKING SYSTEM

(71) Applicant: Continental Automotive Technologies GmbH, Hannover (DE)

(72) Inventors: Bogdan Budianu, Oberursel (DE); Ana Macanu, Iasi (RO); Andreas Strecker, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 319 days.

(21) Appl. No.: 17/999,720

(22) PCT Filed: May 18, 2021

(86) PCT No.: PCT/DE2021/200068
§ 371 (c)(1),
(2) Date: Nov. 23, 2022

(87) PCT Pub. No.: WO2021/239194
PCT Pub. Date: Dec. 2, 2021

(65) Prior Publication Data
US 2023/0234547 A1    Jul. 27, 2023

(30) Foreign Application Priority Data

May 28, 2020  (EP) ..................................... 20465527
Jun. 2, 2020  (DE) ..................... 10 2020 206 842.9

(51) Int. Cl.
*B60T 17/22* (2006.01)
*B60R 16/03* (2006.01)

(52) U.S. Cl.
CPC ............ *B60T 17/221* (2013.01); *B60R 16/03* (2013.01); *B60T 2270/413* (2013.01); *B60T 2270/414* (2013.01); *B60Y 2306/13* (2013.01); *B60Y 2400/81* (2013.01)

(58) Field of Classification Search
CPC .. B60T 17/22; B60T 17/221; B60T 2270/413; B60T 2270/414; B60R 16/03
USPC .......................................................... 303/199
See application file for complete search history.

(56) References Cited

U.S. PATENT DOCUMENTS

2020/0324744 A1   10/2020   Mizusaki et al.
2021/0162971 A1   6/2021    Brenn et al.

FOREIGN PATENT DOCUMENTS

| DE | 102017221621 A1 * | 6/2019 |
| DE | 102018212392 A1 | 1/2020 |
| DE | 102018213284 A1 | 2/2020 |
| DE | 112018006055 T5 | 8/2020 |

(Continued)

OTHER PUBLICATIONS

German Search Report dated Mar. 5, 2021 for the counterpart German Patent Application No. 10 2020 206 842.9.

(Continued)

*Primary Examiner* — Thomas J Williams

(57) ABSTRACT

A method for operating a braking system, wherein a switchable connection between two connection points is open in normal operation, and a voltage difference across the switchable connection is reduced by recuperation before said switchable connection is closed, which serves to compensate for a disturbance in an on-board electrical system. As a result, it is possible to avoid excess currents in the event of the closing of the switchable connection.

15 Claims, 2 Drawing Sheets

(56) References Cited

FOREIGN PATENT DOCUMENTS

EP        1157873 A2    11/2001
EP        3113315 A1    1/2017

OTHER PUBLICATIONS

The International Search Report and the Written Opinion of the International Searching Authority mailed on Sep. 14, 2021 for the counterpart PCT Application No. PCT/DE2021/200068.
Korean Office Action dated Jun. 27, 2024, in corresponding Korean Patent Application No. 10-2022-7037768.

\* cited by examiner

METHOD FOR OPERATING A BRAKING SYSTEM

CROSS-REFERENCE TO RELATED APPLICATIONS

The present application is a National Stage Application under 35 U.S.C. § 371 of International Patent Application No. PCT/DE2021/200068 filed on May 18, 2021, and claims priority from European Patent Application 20465527.8 filed on May 28, 2020, in the European Patent Office, and German Patent Application No. 10 2020 206 842.9 filed on Jun. 2, 2020, in the German Patent and Trademark Office, the disclosures of which are herein incorporated by reference in their entireties.

BACKGROUND

1. Field

Exemplary embodiments of the present application relate to a method for operating a braking system.

2. Description of Related Art

Braking systems are used in motor vehicles, for example, in order to decelerate and brake them. Such braking systems are typically connected both to a battery and to an on-board vehicle electrical system, which is supplied from an alternator, in order to have increased failsafety. By way of example, if an on-board vehicle electrical system fails an account of a technical defect, then the battery is available as an emergency supply. Interruptions or failures during the function of the braking system are avoided as a result.

However, it has been found that in the event of a failure of the on-board vehicle electrical system and switching to battery operation that is then necessary, particularly high currents can occur, which can constitute a loading for components.

SUMMARY

It is therefore an object of an embodiment to provide a method for operating a braking system which is implemented in an alternative or better way, for example prevents an excessively high current in the event of switching to battery operation.

This is achieved according to an embodiment by means of a method as claimed in claim 1. Advantageous embodiments can be gathered from the dependent claims, for example. The content of the claims is incorporated in the content of the description by express reference.

According to an embodiment, there is provided a method for operating a braking system. The braking system comprises a first input voltage terminal and a second input voltage terminal. It comprises an electric motor. Furthermore, it comprises a switchable connection between a first connection point connected to the first input voltage terminal and a second connection point connected to the second input voltage terminal and the electric motor.

The switchable connection is open in normal operation. In response to a detected voltage difference between the first input voltage terminal and the second input voltage terminal which is above a first threshold value, the electric motor is operated in a recuperation mode. Then in response to a detected voltage difference between the first connection point and the second connection point which is below a second threshold value, the switchable connection is closed.

Such a method makes it possible to ensure that a voltage difference between the first connection point and the second connection point firstly decreases to a value which is significantly below the otherwise occurring values of voltage differences. The recuperation mode of the electric motor is used for this purpose. In the case of a smaller voltage difference, which in other words is below the second threshold value, a current flow to be expected on account of this voltage difference is significantly smaller than if the recuperation mode had not been used previously. This constitutes a considerable advantage in comparison with known implementations since it is possible to protect components which could be damaged in the case of the high voltage differences and accordingly high currents that occur otherwise.

The electric motor is used for example to drive a pump or a linear actuator of the braking system. Pressure can thus be built up independently of a driver's actuation.

The switchable connection can be embodied for example in the form of a relay or a transistor. It can either connect the first connection point and the second connection point to one another or disconnect them from one another, depending on the desired situation. The first connection point can be connected to the first input voltage terminal for example directly or else via a further switch such as, for example, a transistor or via a diode. The same applies to the connection between the second connection point and the second input voltage terminal.

The input voltage terminals are typically terminals which serve for connection to external electrical conductors such as, for example, an on-board vehicle electrical system or a battery. In particular, the first input voltage terminal can be connected to a battery, for example a customary vehicle battery, which can be embodied as a rechargeable battery. Such a terminal is typically designated as terminal 30_1 (KL30_1). The second input voltage terminal can be connected in particular to an on-board vehicle electrical system and/or to an alternator. Such a terminal is typically designated as terminal 30_2 (KL30_2). In particular, respective voltage sensors can be arranged at the two input voltage terminals in order to measure the respective voltage present. In this way, for example, the voltage difference between the input voltage terminals can be detected.

Respective voltage sensors can also be connected to the two connection points. By this means, for example, the voltage difference between the connection points can be detected.

Sudden drops in voltage are to be expected particularly in the case of an on-board vehicle electrical system or in the case of a connection to an alternator, and thus in particular at the second input voltage terminal, if the latter is connected to an on-board vehicle electrical system or to an alternator and the first input voltage terminal is connected to a battery.

In normal operation, provision can be made, in particular, for the electric motor to be supplied from the second input voltage terminal.

In particular, a corresponding drive circuit for the electric motor can be present, which in particular can also be equipped with a buffer capacitor. Said drive circuit can be connected in particular directly to the second connection point. Momentarily occurring voltage fluctuations can thus be bridged, without failure of the electric motor occurring.

The recuperation mode can be in particular an operating mode in which the electric motor does not consume current, but rather generates current. Typically, for this purpose, as energy source a pressure is used which is present in a pump connected to the electric motor or in a linear actuator connected to said pump and may have been generated in particular by the electric motor itself or else by a manually actuated master brake cylinder of the motor vehicle. An existing rotation of the electric motor can also be used as energy source. Such a recuperation mode can typically be used to recover energy during braking and to store it in a vehicle battery, for example. In the case present here, however, said recuperation mode can be used to significantly reduce the voltage difference responsible for the flowing of a current that occurs in the event of the closing of the switchable connection, and thus to avoid damage.

The operation of the electric motor in the recuperation mode can be instigated in particular if the detected voltage difference between the first input voltage terminal and the second input voltage terminal is above the first threshold value for a time duration of at least 10 µs, at least 20 µs, at least 50 µs, at least 100 µs, at least 1 ms, at least 10 ms, at least 100 ms, at least 200 ms or at least 300 ms. However, other values can also be used.

In accordance with one preferred embodiment, with the switchable connection closed, in response to a detected voltage difference between the first input voltage terminal and the second input voltage terminal which is below a third threshold value for a first time duration, the switchable connection is opened and/or there is a return to normal operation. What can be achieved as a result is that the supply of the electric motor from the first input voltage terminal is ended as soon as this is no longer required.

The first time duration can be in particular between 10 ms and 30 ms. It can also be 20 ms. It can also be for example up to 500 ms, 1 s or 1.8 s. However, other values are also possible here.

In a state in which the electric motor is operated in the recuperation mode, but the switchable connection is still open, in particular for the case where the voltage difference between the first input voltage terminal and the second input voltage terminal falls below a fourth threshold value, there can be a return again to normal operation. This makes it possible to avoid actually switching to battery operation or supply from the first input voltage terminal if the undershooting of the first threshold value was only temporary, for example on account of a fluctuation in the on-board electrical system that is not based on a technical defect. The fourth threshold value can be in particular identical to the first threshold value, but also different than that.

In particular, upon direct return from the recuperation mode to normal operation, or upon a predefined number of direct return from the recuperation mode to normal operation within a predefined monitoring time being exceeded, a return prohibition can be activated, which can remain activated in particular for a predetermined safeguard time The predetermined safeguard time can be for example at most 1 s, at most 1.8 s or at most 10 s. It can also be 1 s, 1.8 s or 10 s. Such values have proved to be advantageous for typical applications. However, other values can also be used. By way of example, the safeguard time can also last until the next ignition change, for the present ignition run or until a reset in a workshop. The monitoring time can be for example at most 10 s, at most 20 s or at most 50 s. It can also be 10 s, 20 s or 50 s. It can also last until the next ignition change or for the present ignition run. With the return prohibition activated, in particular a return to normal operation is then prevented. This makes it possible to prevent a plurality of fluctuations that occur momentarily one after another from resulting in constant activation and deactivation of the recuperation mode. In particular, in the case of an atypically increased conduction resistance, for example triggered by a corroded contact, which results in an increased voltage loss at the second input voltage terminal during normal operation, and does not result in an increased voltage loss at the second input voltage terminal during recuperation operation, the constant activation and deactivation of the recuperation mode can be prevented. A change counter can be used, for example, which is incremented upon each return from the recuperation mode directly to normal operation in order to monitor how often such a return has already taken place.

After activation of the return prohibition, in particular a fault memory entry can be carried out. The latter can be in particular specific to an activated return prohibition, i.e. it is indicative of the fact that a changeover from the recuperation mode directly to the normal mode has taken place once or repeatedly. This can be in particular an indication of a high-impedance contact. Furthermore, in particular after activation of the return prohibition, a return to the normal state can also be prevented until the deactivation of an ignition. This can in particular also concern the case where the switchable connection is closed from the recuperation mode. The braking system thus remains in this state for the present ignition run.

The third threshold value can be in particular identical to the first threshold value. However, it can also be different than that.

The third threshold value can be in particular between 3.5 V and 4.5 V, or 4 V. Such values have turned out to be advantageous, in particular in a typical on-board vehicle electrical system operated with a voltage of 12 V. However, different values can also be used, particularly if an on-board vehicle electrical system with a different voltage is used. The voltages specified here can then be scaled with the on-board electrical system voltage, for example.

Preferably, the switchable connection is also closed in response to a second time duration being exceeded, in which second time duration the electric motor is operated in the recuperation mode. As a result, for the case where the recuperation mode cannot reduce the voltage difference rapidly enough, it is nevertheless possible to ensure that switching to battery operation is effected in a timely manner, thereby ensuring the power supply of the electric motor. The second time duration can be in particular between 10 ms and 100 ms, or between 25 ms and 75 ms, or 50 ms. However, other values are also possible.

The first threshold value can be in particular between 3.5 V and 4.5 V, or 4 V. Such values have proved to be advantageous since they ensure that the recuperation mode is not yet activated in the case of relatively small, common voltage fluctuations in an on-board vehicle electrical system, but is nevertheless activated in the event of a disturbance having a technical cause. However, other values can also be used, for example in the case of an on-board electrical system voltage different than 12 V.

The second threshold value can be in particular between 0.25 V and 2 V, or 0.5 V. In the case of such voltages, initial currents which may result in damage to components typically do not occur. However, other values are also possible here.

In particular, in response to a detected voltage difference between the first input voltage terminal and the second input voltage terminal which is above a fifth threshold value for a third time duration, a warning function can be activated. As a result, a driver can be warned of possible restrictions during the operation of the braking system, where this can be done for example by means of a warning light or an acoustic signal. The fifth threshold value can be in particular identical to the first threshold value, but also different than that.

The third time duration can be in particular between 50 ms and 1 s, or 100 ms. It can also be at least 50 ms, at least 100 ms or at least 200 ms. It can also be at most 100 ms, at most 200 ms or at most 1 s. Such values have proved to be suitable for typical applications since the driver is then warned in a timely manner.

The first input voltage terminal can be connected to a battery, in particular. The second input voltage terminal can be connected to a generator, in particular. Such a generator may also be referred to as an alternator, a customary on-board vehicle electrical system typically being disposed between generator and second input voltage terminal. Since numerous consumers are connected to said on-board vehicle electrical system and can load the latter, a voltage fluctuation can also occur at such an on-board vehicle electrical system, and a malfunction can furthermore occur, to which it is possible to react as described herein.

In particular, in addition to the battery, a capacitor can also be connected to the first input voltage terminal, wherein this can involve in particular a capacitor having a very high capacitance of, for example, at least 1 farad and/or at most 50 farads. Such a capacitor can provide additional safety for the case where the connection to a battery or some other voltage source connected to the first input voltage terminal is interrupted. As a result, even for the failure of the battery and the failure of an on-board vehicle electrical system, a supply can still be ensured, for example in order to brake a vehicle in a controlled manner or in order to give a driver time to react to a warning message and to ensure that for that period the braking system will not fail or offer an excessively low performance for a certain time. In particular, such a capacitor can be damaged by currents which can occur in the case of embodiments in accordance with the prior art. The embodiment described herein thus protects said capacitor in a particularly advantageous manner.

In particular, a first switch or a first diode can be connected between the first input voltage terminal and the first connection point. Likewise, a second switch or a second diode can be connected between the second input voltage terminal and the second connection point. Such first and/or second switches can be embodied as transistors, for example. They can serve the purpose in particular of having additional switching means available. In particular, they can be opened in order to disconnect one of the input voltage terminals and a connection point connected thereto from one another, for example in order to prevent a current from flowing out of the second connection point into the second input voltage terminal and into an on-board electrical system. Accordingly, diodes, if present, can be polarized.

In particular, a valve arrangement of the braking system can be connected to the first connection point. Consequently, in normal operation, said valve arrangement is operated from the first input voltage terminal, for example by means of a battery. If the switchable connection is closed, typically both the electric motor and the operator control arrangement are supplied by means of the first input voltage terminal.

In particular, a diode having a forward direction toward the second connection point can be interconnected in parallel with the switchable connection. This makes it possible to ensure, in a simple manner, that a consumer directly connected to the second connection point, for example the valve arrangement mentioned in the previous paragraph, can be supplied, in principle, from the second input voltage terminal, without this necessitating a switching process. For the case of failure of the battery, the corresponding consumer can thus continue to be supplied unproblematically. In the opposite direction, however, a supply is possible only by means of active closing of the first connection.

According to an embodiment, there is provided a braking system which is embodied as already described further above and is configured to carry out a method according to an embodiment. With regard to the braking system and the method, it is possible to have recourse to all embodiments and variants described herein.

In general terms, the present invention involves reducing a voltage difference in the event of the closing of a switchable connection, in order to reduce possibly harmful currents. A recuperation function of an electric motor can advantageously be used for this purpose. The electric motor can be a brushless DC motor, for example. The energy can in this case originate in particular from an elastic energy of an already pressurized system, or else from a kinetic energy of an already rotating electric motor.

BRIEF DESCRIPTION OF THE DRAWINGS

Embodiments will now be described with reference to the figures. In this case, in the figures.

DETAILED DESCRIPTION

Figure 1:
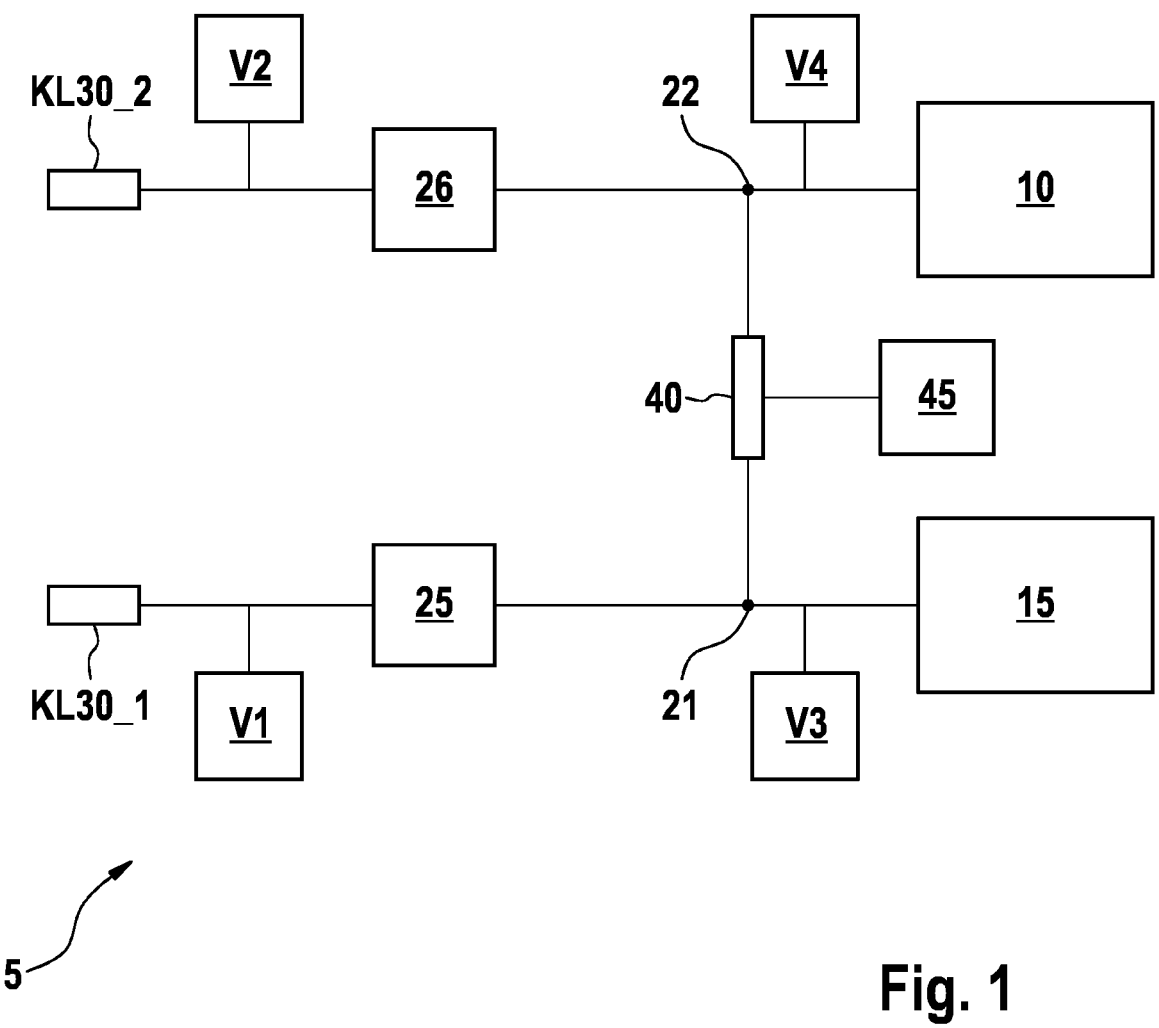
FIG. 1 is a diagram illustrating a braking system according to an embodiment.

FIG. 1 shows a braking system 5, on which a method according to an embodiment can be carried out.

The braking system 5 comprises a first input voltage terminal KL30_1 and a second input voltage terminal KL30_2. The first input voltage terminal KL30_1 is typically connected to a battery. The second input voltage terminal KL30_2 is typically connected to an on-board electrical system of a motor vehicle.

The first input voltage terminal KL30_1 is connected to a first connection node 21 via a first switch 25. The second input voltage terminal KL30_2 is connected to a second connection node 22 via a second switch 26. The switches 25, 26 can for example be embodied as transistors and serve to interrupt or enable the connection between the respective input voltage terminal KL30_1, KL30_2 and the connection node 21, 22.

A valve arrangement 15 is connected to the first connection node 21. Said valve arrangement includes a plurality of switchable valves that serve for the operation of the braking system, but they will not be discussed any further here.

The second connection node 22 is connected to an electric motor 10. The electric motor 10 typically drives a pump or a linear actuator in order to generate pressure in the braking system 5 independently of the driver.

Figure 2:
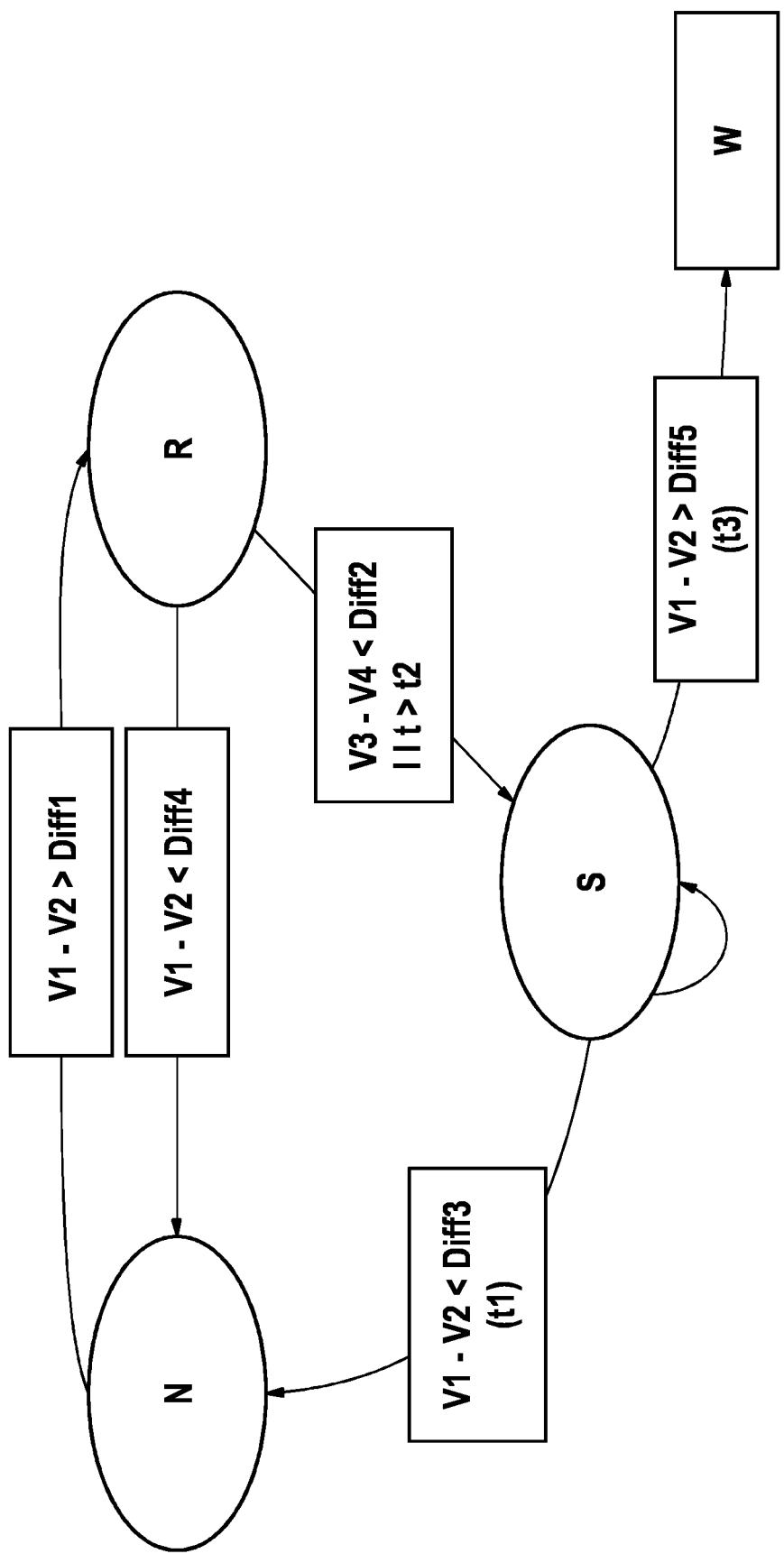
FIG. 2 is a flow diagram illustrating a method of operating a braking system according to an embodiment.

A switchable connection 40 is formed between the first connection node 21 and the second connection node 22. Said switchable connection can be switched to be either open or closed. Consequently, the first connection node 21 and the second connection node 22 can be disconnected from one another or connected to one another in a targeted manner. A control device 45 is provided for control purposes, which control device carries out a method according to an embodiment, as will be described below with reference to FIG. 2.

The braking system 5 has a total of four voltage sensors, which are designated with their respective voltages in FIG. 1. In this regard, a first voltage V1 is measured at the first input voltage terminal KL30_1. A second voltage V2 is measured at the second input voltage terminal KL30_2. A third voltage V3 is measured at the first connection node 21. A fourth voltage V4 is measured at the second connection node 22. The procedure will now be described by way of example with reference to FIG. 2.

The braking system is initially in normal operation N with all components functioning entirely satisfactorily. In this case, a voltage difference V1–V2 between the first input voltage V1 and the second input voltage V2 is continuously monitored. If said voltage difference exceeds a first threshold value Diff1, then the braking system 5 firstly transitions to a recuperation mode R. The recuperation mode R is characterized in that the electric motor 10 is operated in recuperation for a limited time, such that it can obtain energy from its rotation that is present anyway, or from a pressure in a hydraulic area of the braking system 5. As a result, the voltage at the second connection node 22 is increased by means of the electric motor 10. The voltage difference V3–V4 otherwise present between the first connection node 21 and the second connection node 22 is reduced in this way. If said voltage difference falls below a second threshold value Diff2 or alternatively if a second time duration t2 has elapsed, the braking system 5 switches to a switched mode S, in which the switchable connection 40 is closed. Consequently, a supply of the electric motor 10 by means of the first input voltage terminal KL30_1 is now possible. In other words, if the supply by the on-board electrical system at the second input voltage terminal KL30_2 fails, this failure is compensated for by the electric motor 10 then running in battery operation.

By contrast, if in the recuperation mode the voltage difference V1–V2 between first input voltage terminal KL30_1 and second input voltage terminal KL30_2 falls below a fourth threshold value Diff4, then the switchable connection 40 is not opened, rather there is a return directly to the normal state, that is to say that the recuperation is ended. In this case, a return prohibition is directly activated, which remains active for a predetermined safeguard time period. If, with the return prohibition activated, there is again a changeover to the recuperation mode and then the event occurs again that, before the opening of the switchable connection 40, the voltage difference V1–V2 between first input voltage terminal KL30_1 and second input voltage terminal KL30_2 drops below the fourth threshold value Diff4, then a return to the normal state is prevented. Rather, there is then necessarily firstly a changeover to the switched state, specifically according to the rules already explained further above. As an alternative to the direct activation of the return prohibition, a change counter can also be incremented whenever a transition from normal operation to the recuperation mode takes place. If the counter assumes a specific value of 2, 3, 4 or 5, for example, and this occurs in particular within a predefined monitoring time of, for example, 10 s, 20 s or 50 s or else by the next ignition change, the return prohibition is activated. As a result, repeated changeover between normal operation and recuperation mode can be permitted.

If the voltage difference V1–V2 between the first input voltage terminal KL30_1 and the second input voltage terminal KL30_2 falls below a third threshold value Diff3 again at least for a first time duration t1, then the system returns to normal operation, that is to say that, in particular, the switchable connection 40 is opened again. Consequently, therefore, once again the electric motor 10 is operated exclusively from the second input voltage terminal KL30_2 and the valve unit 15 is operated exclusively from the first input voltage terminal KL30_1.

However, if the voltage difference V1–V2 between the first input voltage terminal KL30_1 and the second input voltage terminal KL30_2 is above a fifth threshold value Diff5 for a third time duration t3, then a warning message W is activated. This can be for example a display in an instrument panel of a motor vehicle. As a result, the driver is made aware that the braking system has a malfunction and he/she ought to drive more cautiously since operational restrictions of the braking system 5 should possibly be expected.

Abovementioned steps of the method according to an embodiment can be carried out in the order indicated. However, they can also be carried out in a different order, insofar as is technically appropriate. In one of its embodiments, for example with a specific combination of steps, the method according to an embodiment can be carried out in such a way that no further steps are carried out. However, in principle, further steps can also be carried out, including steps that have not been mentioned.

It is pointed out that features may be described in combination in the claims and in the description, for example in order to facilitate understanding, even though these can also be used separately from one another. A person skilled in the art will recognize that such features, independently of one another, can also be combined with other features or feature combinations.

Dependency references in dependent claims may characterize preferred combinations of the respective features but do not exclude other feature combinations.

The invention claimed is:

1. A braking system comprising:
    a first input voltage terminal;
    a second input voltage terminal;
    an electric motor; and
    a switchable connection between a first connection point connected to the first input voltage terminal and a second connection point connected to the second input voltage terminal and the electric motor,
    wherein the switchable connection is open in normal operation, and
    wherein in response to a detected voltage difference between the first input voltage terminal and the second input voltage terminal which is above a first threshold value, the electric motor is configured to operate in a recuperation mode, and in response to a detected voltage difference between the first connection point and the second connection point which is below a second threshold value, the switchable connection is closed.

2. The braking system as claimed in claim 1, wherein with the switchable connection closed, in response to a detected voltage difference between the first input voltage terminal and the second input voltage terminal which is below a third threshold value for a first time duration, the switchable connection is opened and the electric motor is configured to operate in normal operation.

3. The braking system as claimed in claim 2, wherein the third threshold value is identical to the first threshold value wherein the third threshold value is between 3.5 V and 4.5 V, and wherein the first time duration is between 10 ms and 30 ms.

4. The braking system as claimed in claim 3, wherein in a state in which the electric motor is operated in the recuperation mode, and the switchable connection is open, in response to the voltage difference between the first input voltage terminal and the second input voltage terminal falling below a fourth threshold value, the electric motor is configured to operate in normal operation.

5. The braking system as claimed in claim 4, wherein upon return from the recuperation mode to normal operation, or upon a predefined number of direct return from the recuperation mode to normal operation within a predefined monitoring time being exceeded, a return prohibition is activated, which remains activated for a predetermined safeguard time, wherein with the return prohibition activated, a direct return from the recuperation mode to normal operation is prevented.

6. The braking system as claimed in claim 5, wherein after activation of the return prohibition, a fault memory entry is carried out and a return to the normal state is prevented until the deactivation of an ignition.

7. The braking system as claimed in claim 6, wherein the switchable connection is closed in response to a second time duration being exceeded, in which second time duration the electric motor is operated in the recuperation mode.

8. The braking system as claimed in claim 7, wherein the second time duration is between 10 ms and 100 ms.

9. The braking system as claimed in claim 8, wherein the first threshold value is between 3.5 V and 4.5 V, and wherein the second threshold value is between 0.25 V and 2 V.

10. The braking system as claimed in claim 9, wherein in response to a detected voltage difference between the first input voltage terminal and the second input voltage terminal which is above a fifth threshold value for a third time duration, the electric motor is configured to activate a warning function.

11. The braking system as claimed in claim 10, wherein the third time duration is between 50 ms and 1 s.

12. The braking system as claimed in claim 11, wherein the first input voltage terminal is connected to a battery, and wherein the second input voltage terminal is connected to a generator.

13. The braking system as claimed in claim 12, further comprising:
   a first switch or a first diode connected between the first input voltage terminal and the first connection point; and
   a second switch or a second diode connected between the second input voltage terminal and the second connection point.

14. The braking system as claimed in claim 13, further comprising a valve arrangement connected to the first connection point.

15. The braking system as claimed in claim 14, further comprising a diode having a forward direction toward the first connection point interconnected in parallel with the switchable connection.

* * * * *